United States Patent
Bevan et al.

(10) Patent No.: US 10,443,465 B2
(45) Date of Patent: Oct. 15, 2019

(54) ENGINE EXHAUST SYSTEM AND CONTROL SYSTEM FOR AN ENGINE EXHAUST SYSTEM

(71) Applicant: Jaguar Land Rover Limited, Coventry (GB)

(72) Inventors: Neil Bevan, Coventry (GB); Michael Davies, Coventry (GB); Andrew Lilley, Coventry (GB); Robert Bending, Coventry (GB)

(73) Assignee: Jaguar Land Rover Limited, Coventry, Warwickshire (GB)

(*) Notice: Subject to any disclaimer, the term of this patent is extended or adjusted under 35 U.S.C. 154(b) by 0 days.

(21) Appl. No.: 15/327,140

(22) PCT Filed: Aug. 12, 2015

(86) PCT No.: PCT/EP2015/068529
§ 371 (c)(1),
(2) Date: Jan. 18, 2017

(87) PCT Pub. No.: WO2016/023940
PCT Pub. Date: Feb. 18, 2016

(65) Prior Publication Data
US 2017/0167339 A1    Jun. 15, 2017

(30) Foreign Application Priority Data
Aug. 12, 2014   (GB) .................................. 1414274.9

(51) Int. Cl.
*F01N 3/20* (2006.01)
*F01N 3/08* (2006.01)
(Continued)

(52) U.S. Cl.
CPC ............... *F01N 3/20* (2013.01); *F01N 3/021* (2013.01); *F01N 3/035* (2013.01); *F01N 3/08* (2013.01);
(Continued)

(58) Field of Classification Search
CPC ..... F01N 3/08; F01N 3/10; F01N 3/20; F01N 3/206; F01N 3/2066; F01N 3/208;
(Continued)

(56) References Cited

U.S. PATENT DOCUMENTS 7,926,263 B2 *  4/2011  Stroh ..................... F01N 3/0814
                                                         60/274
8,122,712 B2 *  2/2012  Ren ........................ F01N 3/0821
                                                         60/274
(Continued)

OTHER PUBLICATIONS

Combined Search and Examination Report, GB Application No. 1414274.9, dated Feb. 23, 2015, 7 pages.
(Continued)

*Primary Examiner* — Phutthiwat Wongwian
*Assistant Examiner* — Diem T Tran
(74) *Attorney, Agent, or Firm* — Myers Bigel, P.A.

(57) ABSTRACT

An exhaust system for an internal combustion engine (28) for controlling the release of undesirable emissions from the engine comprises an exhaust pipe (32) for receiving an exhaust flow from the engine, an SCR catalyst (48) arranged in the exhaust flow and means (80) for determining the temperature of the SCR catalyst. A NOx absorber (38), such as a diesel oxidation and NOx absorber catalyst (DONAC), is located in the exhaust flow at a position upstream of the SCR catalyst (48) for absorbing and releasing NOx contained in the exhaust flow. Means is provided for controlling the NOx absorber (38) so as to control the release of NOx to the SCR catalyst (48) in dependence on the temperature
(Continued)

of the SCR catalyst, thereby to effect active management of release of NOx from the DONAC (38).

12 Claims, 5 Drawing Sheets

(51) Int. Cl.
*F01N 3/10* (2006.01)
*F01N 9/00* (2006.01)
*F01N 3/021* (2006.01)
*F01N 3/035* (2006.01)
*F01N 13/00* (2010.01)

(52) U.S. Cl.
CPC ......... *F01N 3/0814* (2013.01); *F01N 3/0842* (2013.01); *F01N 3/10* (2013.01); *F01N 3/106* (2013.01); *F01N 3/2066* (2013.01); *F01N 9/00* (2013.01); *F01N 13/0097* (2014.06); *F01N 2550/02* (2013.01); *F01N 2550/03* (2013.01); *F01N 2560/026* (2013.01); *F01N 2570/12* (2013.01); *F01N 2570/18* (2013.01); *F01N 2900/1602* (2013.01); *Y02A 50/2325* (2018.01); *Y02T 10/24* (2013.01); *Y02T 10/47* (2013.01)

(58) Field of Classification Search
CPC ........ F01N 3/021; F01N 3/035; F01N 3/0814; F01N 2900/1614; F01N 2900/1622
USPC .................. 60/286, 295, 297, 301, 303, 311
See application file for complete search history.

(56) References Cited

U.S. PATENT DOCUMENTS

| 8,171,723 B2* | 5/2012 | Hagimoto ............. F01N 3/2066 60/286 |
| 2010/0192547 A1 | 8/2010 | Yabe et al. |
| 2013/0047583 A1* | 2/2013 | Driscoll ................. F01N 3/106 60/274 |
| 2013/0111886 A1 | 5/2013 | Gonze et al. |
| 2013/0115150 A1* | 5/2013 | Fritsch ................. F01N 3/2066 423/212 |
| 2013/0186064 A1 | 7/2013 | Mehta |

OTHER PUBLICATIONS

Notification of Transmittal of the International Search Report and the Written Opinion of the International Searching Authority, or the Declaration, PCT/EP2015/068529, dated Oct. 16, 2015, 15 pages.
Summons to attend oral proceedings pursuant to Rule 115(1) EPC, EP Application No. 15749804.9, Nov. 21, 2018, 6 pp.
United States Environmental Protection Agency, "Nitrogen Oxides (NOx), Why and How They are Controlled", Technical Bulletin EPA 456/F-99-006R, Nov. 1999, 57 pp.
Diffen, "Absorption vs Adsorption", retrieved from https://web.archive.org/web/20140414103257/https://www.diffen.com/difference/Absorption_vs_Adsorption, Available as of filing date, 3 pp.

* cited by examiner

ENGINE EXHAUST SYSTEM AND CONTROL SYSTEM FOR AN ENGINE EXHAUST SYSTEM

RELATED APPLICATIONS

This application is a 35 U.S.C. § 371 national stage application of PCT Application No. PCT/EP2015/068529, filed on Aug. 12, 2015, which claims priority from Great Britain Patent Application No. 1414274.9 filed on Aug. 12, 2014, the contents of which are incorporated herein by reference in their entireties. The above-referenced PCT International Application was published in the English language as International Publication No. WO 2016/023940 A1 on Feb. 18, 2016.

TECHNICAL FIELD

The present invention relates to an exhaust system comprising an SCR catalyst for controlling undesirable emissions, such as NOx, from an internal combustion engine. Aspects of the invention also relate to a control system for an exhaust system of an internal combustion engine and to a method of controlling undesirable emissions from an internal combustion engine by means of such an exhaust system.

BACKGROUND

It is well known that internal combustion engines can produce undesirable chemical species in their exhaust streams. It is therefore desirable to eliminate or at least reduce such pollutants to levels low enough that human health is not adversely affected. As a result of the high temperatures that are reached during a combustion event, many chemical species are produced from the combustion of hydrocarbon fuels in air, including the oxides of nitrogen (NO and $NO_2$, collectively referred to as $NO_x$). Due to their impact on human health, many countries have enacted legislation that seeks to limit the emission of NOx from both mobile and stationary sources, and many techniques have been developed to achieve this objective. Among these, the use of catalyst technology has been found to be particularly effective and economically viable.

The remediation of NOx for lean-burn engines requires the addition of a reductant in conjunction with a suitable catalyst. For example, the reduction of NOx requires near real-time reductant dosing control since NOx production closely follows engine load but is moderated by the amount of ammonia already stored on the catalyst. Accordingly, the reductant dosing schedule is a highly dynamic activity. One effective technology for the remediation of NOx in an oxygen-rich exhaust stream is the technique widely known as Selective Catalytic Reduction (hereafter referred to as SCR). In this approach, an ammonia-containing reagent (or reductant) is injected into an exhaust stream at a rate closely related to the instantaneous NOx content of that stream wherein the ammonia ($NH_3$) reacts with the NOx in conjunction with a zeolite-based or similar catalyst such that the pollutant is converted to harmless nitrogen ($N_2$) and water.

A known exhaust system for an internal combustion engine 8 is shown in FIG. 1. The exhaust system includes an exhaust pipe 12 into which exhaust from the engine 8 is received before transfer to a downstream exhaust pipe outlet 14. The exhaust pipe is provided with a diesel oxidation catalyst (DOC) 10 and a diesel particulate filter (DPF) 16 arranged upstream of an SCR catalyst 18. The DOC 10 removes carbon monoxide and hydrocarbons from the exhaust stream 12. The DPF 16 removes diesel particulate matter and soot from the exhaust stream 12. An injector 20 for the reductant is located upstream of the SCR catalyst 18, between the DPF 16 and the SCR catalyst 18. The injector 20 delivers a controlled dose of reductant, such as urea, into the exhaust stream just upstream of a mixer 22 and the SCR catalyst 18. The ammonia in the exhaust flow reacts with the NOx in conjunction with the zeolite based or similar catalyst so that harmless nitrogen (N2) and water is emitted at 14.

One drawback of such a system is that the temperature of the SCR catalyst 18 must be hot enough for it to become effective. On engine start-up, before the SCR catalyst 18 has had chance to heat up, this can lead to problems where insufficient NOx is converted, so that emissions levels are higher than is desirable and to the extent that emissions legislation in some territories may not be satisfied for a period of engine operation. In some engines it is possible to locate the SCR catalyst 18 closer to the engine 8 so as to improve thermal heating of the catalyst, but this solution is not always effective and, in any case, certain vehicle architectures do not suit the reconfiguring of hardware in this way.

It is one object of the present invention to provide an exhaust system, an exhaust control system and a method of controlling an exhaust system which substantially overcomes or mitigates the aforementioned problems.

SUMMARY OF THE INVENTION

According to one aspect of the present invention, there is provided an exhaust system for an internal combustion engine for controlling the release of undesirable emissions from the engine, the exhaust system comprising an exhaust pipe for receiving an exhaust flow from the engine, an SCR catalyst arranged in the exhaust flow, and means for determining the temperature of the SCR catalyst. A NOx absorber is located in the exhaust flow at a position upstream of the SCR catalyst for absorbing and releasing NOx contained in the exhaust flow. A control system is provided for controlling the NOx absorber so as to control the release of NOx to the SCR catalyst depending on the temperature of the SCR catalyst.

It is an object of the present invention to include a NOx absorber in the exhaust flow from the engine which has the ability to store, and to release later, NOx. The release of NOx from the NOx absorber depends on the temperature of the exhaust flow received at the NOx absorber. By controlling the temperature of the exhaust flow the timing of the release of NOx from the absorber can therefore be controlled, so that the downstream SCR catalyst can achieve a desired temperature at which NOx is remediated at a sufficient level, before the NOx is released to it. The NOx absorber is typically a Diesel Oxidation and NOx Absorber Catalyst (DONAC).

By controlling the NOx absorber to release NOx to the SCR catalyst in dependence on the temperature of the SCR catalyst, the control system is operable to actively desorb any absorbed NOx at a time when the SCR is at a suitable temperature for the remediation of the released NOx. By utilising this strategy, the control system can ensure that the quantity of NOx stored in the absorber can advantageously be minimized at times when the SCR catalyst is operable to remediate NOx from the exhaust flow. Advantageously, the spare capacity of the NOx absorber may be optimised for a later time, when the SCR catalyst is below the required temperature for effective NOx remediation.

The control system may comprise a comparator for comparing the temperature of the SCR catalyst with a threshold temperature below which the SCR catalyst is substantially ineffective at NOx conversion.

The control system may be configured to operate above the threshold temperature.

The control system may further comprise a first data memory for storing data relating the temperature of the SCR catalyst to the conversion of the SCR catalyst; and a second data memory for storing data relating the temperature of the NOx absorber to the release of NOx from the absorber. It is convenient if the first data memory is the same as the second data memory.

The exhaust system may further include an injector for injecting a selective catalytic reducing agent into the exhaust flow upstream of the SCR catalyst.

The control system may include a means for controlling the temperature of the NOx absorber so as to control the release of NOx to the SCR catalyst.

The NOx absorber is conveniently a diesel oxidation and NOx absorber catalyst (DONAC).

The exhaust system may include a diesel particulate filter located in the exhaust pipe. The diesel particulate filter may be arranged downstream of the NOx absorber.

For convenience of manufacture and installation, the diesel particulate filter and the NOx absorber may be housed within a common housing.

A secondary emissions catalyst may be located in the exhaust pipe downstream of the SCR catalyst for converting secondary emissions from the exhaust flow.

The exhaust system may further comprise a selective catalytic reduction filter located upstream of the SCR catalyst.

Conveniently, the selective catalytic reduction filter and the SCR catalyst are housed in a common housing.

According to another aspect of the invention, there is provided a method for controlling the release of undesirable emissions in an exhaust flow from an exhaust system of an internal combustion engine, the exhaust system having a SCR catalyst and a NOx absorber upstream of the SCR catalyst. The method comprises determining the temperature of the SCR catalyst; and controlling the NOx absorber in dependence on the temperature of the SCR catalyst so as to control the release of NOx from the NOx absorber to the SCR catalyst.

The method may comprise comparing the temperature of the SCR catalyst with a threshold temperature at which the SCR catalyst becomes effective at remediating NOx in the exhaust flow; and controlling the NOx absorber in dependence on the result of the comparison.

The method may comprise controlling the temperature of the NOx absorber at a relatively high temperature if the temperature of the SCR catalyst is above the threshold temperature so as to increase the release of NOx from the absorber to the SCR catalyst.

According to another aspect of the invention, there is provide a control system for controlling the release of undesirable emissions in an exhaust flow from an exhaust system of an internal combustion engine, the exhaust system having a SCR catalyst and a NOx absorber upstream of the SCR catalyst, the control system comprising means for receiving an input representative of the temperature of the SCR catalyst; a first data memory for storing data relating the temperature of the SCR catalyst to the conversion of the SCR catalyst; means for receiving an input representative of the temperature of the NOx absorber; a second data memory for storing data relating the temperature of the NOx absorber to the release of NOx from the absorber; and means for generating an output signal for controlling the NOx absorber in dependence on the temperature of the SCR catalyst so as to control the release of NOx from the absorber to the SCR catalyst.

According to another aspect of the invention, there is provided a method for diagnosing a fault in the exhaust system according to a previous aspect of the invention, the method comprising in addition to measuring the temperature of the SCR catalyst, measuring the temperature of the NOx absorber; determining, based on pre-determined calibration data, an expected NOx absorption level downstream of the SCR catalyst corresponding to the measured temperature of the NOx absorber and the measured temperature of the SCR catalyst; measuring the NOx level in the exhaust flow downstream of the SCR catalyst; comparing the measured NOx level with the expected NOx level and, in the event that the measured NOx level does not correspond to the expected NOx level, providing an indication that there is a fault within the exhaust system.

According to another aspect of the invention, there is provided a vehicle comprising an exhaust system in accordance with a previous aspect of the invention.

For purposes of this disclosure, it is to be understood that the control system described herein can comprise a control unit or computational device having one or more electronic processors.

A vehicle and/or a system thereof may comprise a single control unit or electronic controller or alternatively different functions of the control system may be embodied in, or hosted in, different control units or controllers.

As used herein, the term "control system" will be understood to include both a single control unit or controller and a plurality of control units or controllers collectively operating to provide the required control functionality.

A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the present invention will now be described, by way of example only, with reference to the accompanying drawings, in which like components are assigned like numerals, and in which.

DETAILED DESCRIPTION

Figure 1:
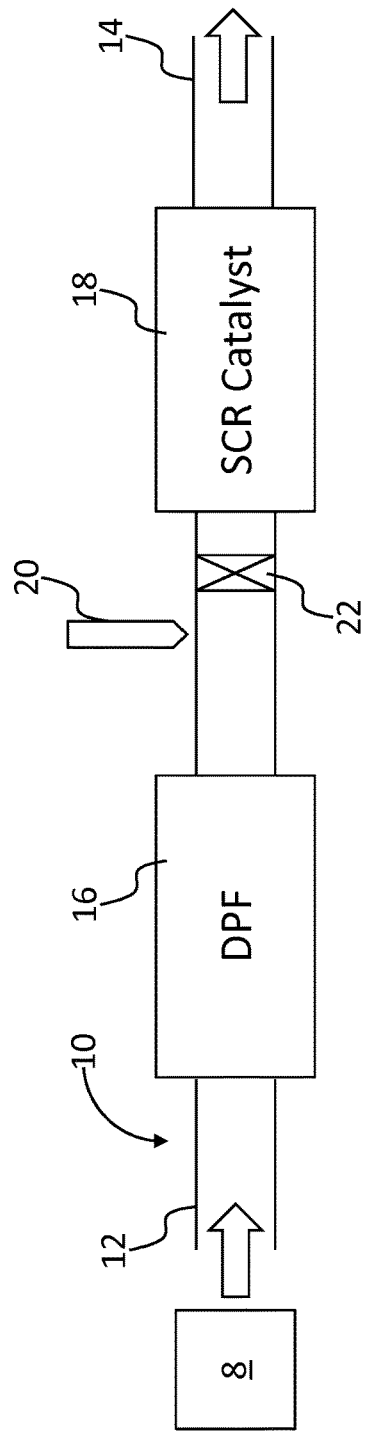
FIG. 1 has already been described and shows a schematic diagram of an exhaust system known in the prior art including a selective catalytic reduction (SCR) catalyst.
Figure 2:
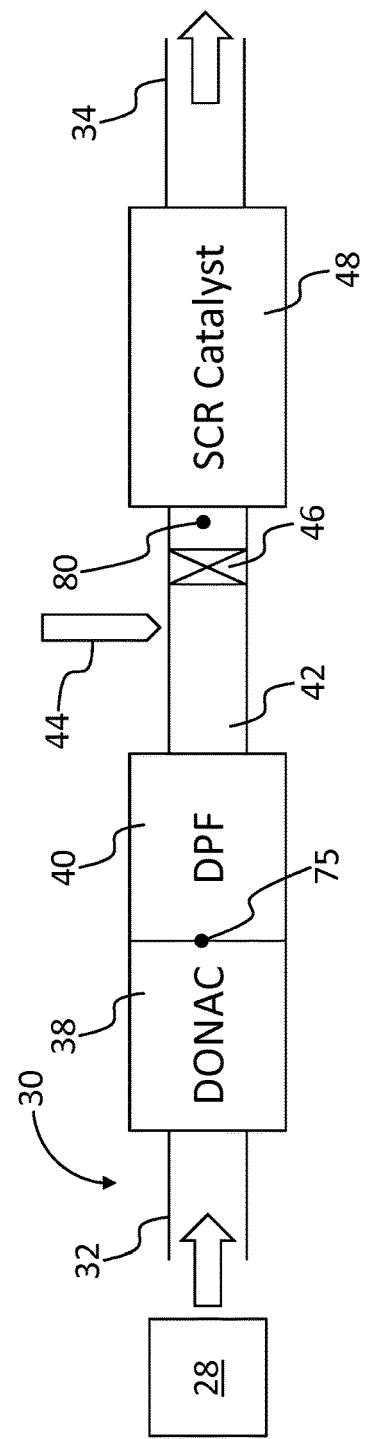
FIG. 2 is a schematic diagram of an exhaust system of one embodiment of the present invention, including a DONAC (Diesel Oxidation and NOx Absorber Catalyst) unit.

Referring to FIG. 2, an exhaust system for an engine such as a compression ignition internal combustion engine or a lean burn gasoline engine 28 of a vehicle includes an exhaust pipe 30 having an inlet end 32 which connects with the engine 28 and an outlet end 34 which expels exhaust externally from the vehicle. The inlet end of the pipe 30 is provided with a Diesel Oxidation and NOx Absorber Catalyst (DONAC) 38 which is located immediately upstream of a Diesel Particular Filter (DPF) 40. The DPF 40 removes diesel particulate matter and soot from the exhaust stream and an outlet from the DPF 40 expels exhaust into a central portion 42 of the pipe 30. The DONAC 38 and the DPF 40 may be housed together within a common housing unit so as to form a single unit to be mounted onto the exhaust pipe 30.

An injector 44 is located in the vicinity of the central portion 42 of the exhaust pipe 30 for injecting a controlled dose of reductant into the exhaust flow, at a position immediately upstream of a mixer 46. The outlet from the central portion 42 of the exhaust pipe 30 delivers a mixture of exhaust and reductant to an SCR (Selective Catalyst Reduction) catalyst unit 48. The reductant in the exhaust flow reacts with the NOx over the catalyst so that harmless nitrogen (N2) and water is emitted from the outlet portion 34 of the exhaust pipe 30. The exhaust pipe 30 is fitted with a temperature sensor (not shown) for measuring the temperature of exhaust expelled from the engine and entering the inlet end 32 of the exhaust pipe. A NOx sensor (not shown) is fitted to the exhaust pipe 30, downstream of the SCR catalyst 48, to measure the level of NOx in the exhaust stream expelled from the outlet portion 34 of the exhaust pipe. A further temperature sensor is fitted immediately downstream of the DONAC at the location indicated by 75. A further temperature sensor is also fitted to the SCR catalyst 48 at the position indicated by 80.

The various portions of the exhaust pipe 30 may be provided with a fibre insulation to ensure there is minimal heat loss during filter regeneration, where heat needs to be transported from the engine 28 and the DONAC 38 downstream to the SCR catalyst 48.

Figure 3:
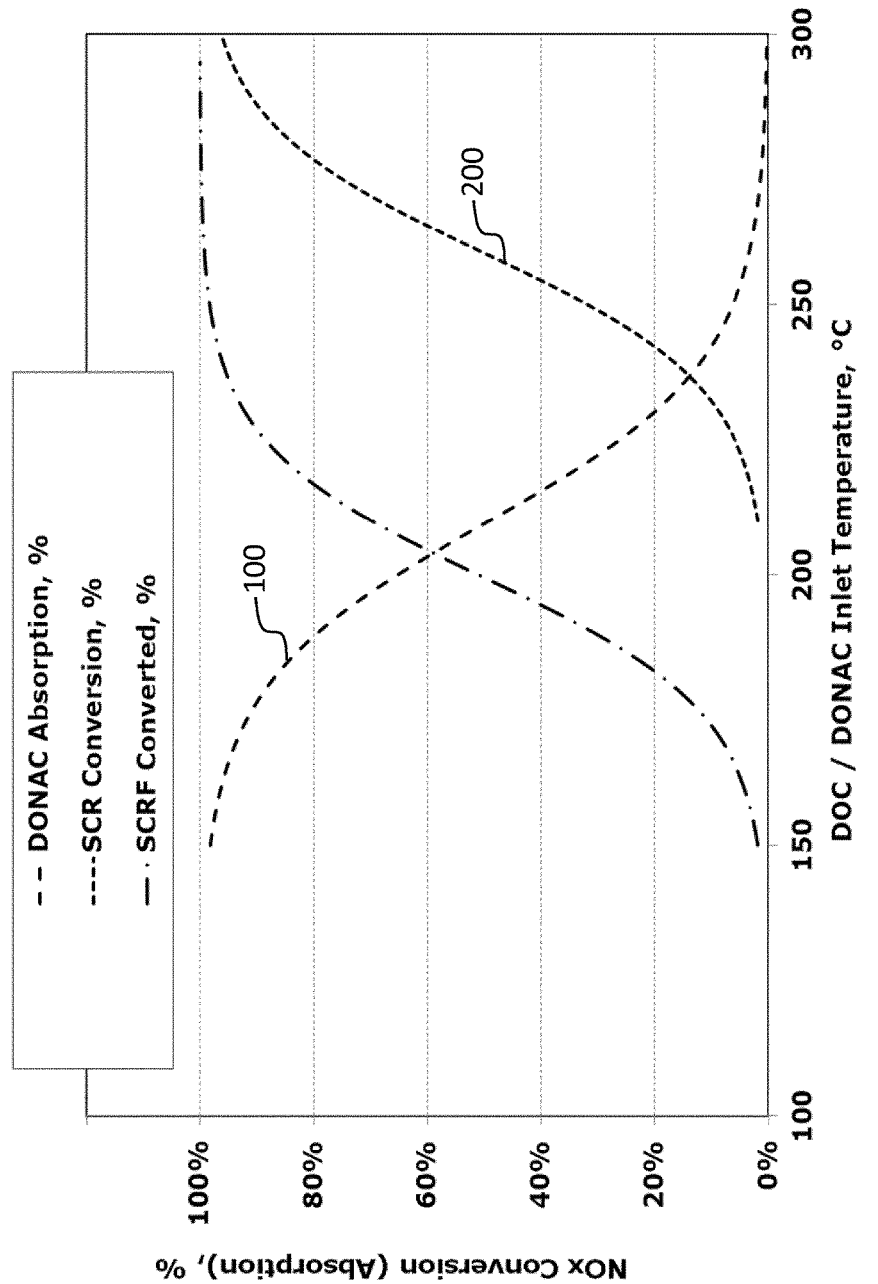
FIG. 3 is a graph to illustrate the effect of including a DONAC unit in the exhaust system of FIG. 2.

The exhaust system has an associated exhaust control system (not shown in FIG. 2) which may be comprised in the main engine control unit for the engine 28. As illustrated in FIG. 3, the response of the DONAC 38 is temperature dependent, as illustrated by line 100, so that at relatively low exhaust temperatures (e.g. around 150 degrees Centigrade), the absorption of NOx is relatively high, whereas at relatively high exhaust temperatures (e.g. around 250 degrees Centigrade) the absorption of NOx is much reduced. In contrast, as illustrated by line 200, the NOx conversion of the SCR catalyst 48 increases with temperature, so that below about 210 degrees Centigrade there is little conversion, whereas for increasing temperatures above 210 degrees Centigrade the conversion starts to increase.

The general principle of operation of the invention is as follows. Upon engine start-up, when the exhaust gas temperature from the engine is relatively low, exhaust is delivered to the inlet end 32 of the exhaust pipe 30 and flows into the DONAC 38.

Because the exhaust gas temperature is relatively low, NOx absorption is relatively high and so, while the exhaust flow is heating up, a relatively high proportion of NOx is stored in the DONAC 38 rather than being passed downstream to the SCR catalyst 48. When the temperature of the exhaust flow increases, the absorption of NOx by the DONAC 38 is reduced so that a higher proportion of NOx starts to flow downstream to the SCR catalyst 48. By this stage, the temperature of the exhaust flow has increased sufficiently so that the NOx conversion of the SCR catalyst 48 has increased, and a sufficiently high level of NOx is remediated by the catalyst 48. As a result, the exhaust flow delivered from the exhaust pipe outlet 34 contains NOx at a suitably low level.

In order to ensure that the release of NOx emissions from the DONAC 38 occurs at a time when the temperature of the SCR catalyst 48 is sufficient to allow satisfactory conversion of NOx, the temperature of the SCR catalyst 48 is measured by a temperature sensor 80. The temperature of the DONAC 38 is controlled in response to the temperature measurement by the sensor 80 so as to ensure release of NOx from the DONAC occurs when the SCR catalyst temperature is sufficient to provide adequate NOx conversion. Knowing the relationship between the temperature of the DONAC 38 and the absorption of NOx by the DONAC, and knowing the relationship between the temperature of the SCR catalyst 48 and the conversion of NOx by the catalyst, enables active management of the NOx emissions level from the exhaust outlet 34 across a full range of engine operating temperatures and including engine start-up.

The temperature of the exhaust flow expelled from the engine 28, and hence entering the DONAC 38, can be controlled in several ways. In one embodiment, the fuel injection strategy can be controlled to alter the exhaust temperature. By way of example, by introducing a post-injection of fuel after the main injection, the temperature of the exhaust flow from the engine 28 can be increased. The efficiency of the combustion process may also be controlled by throttling the air flow.

Figure 4:
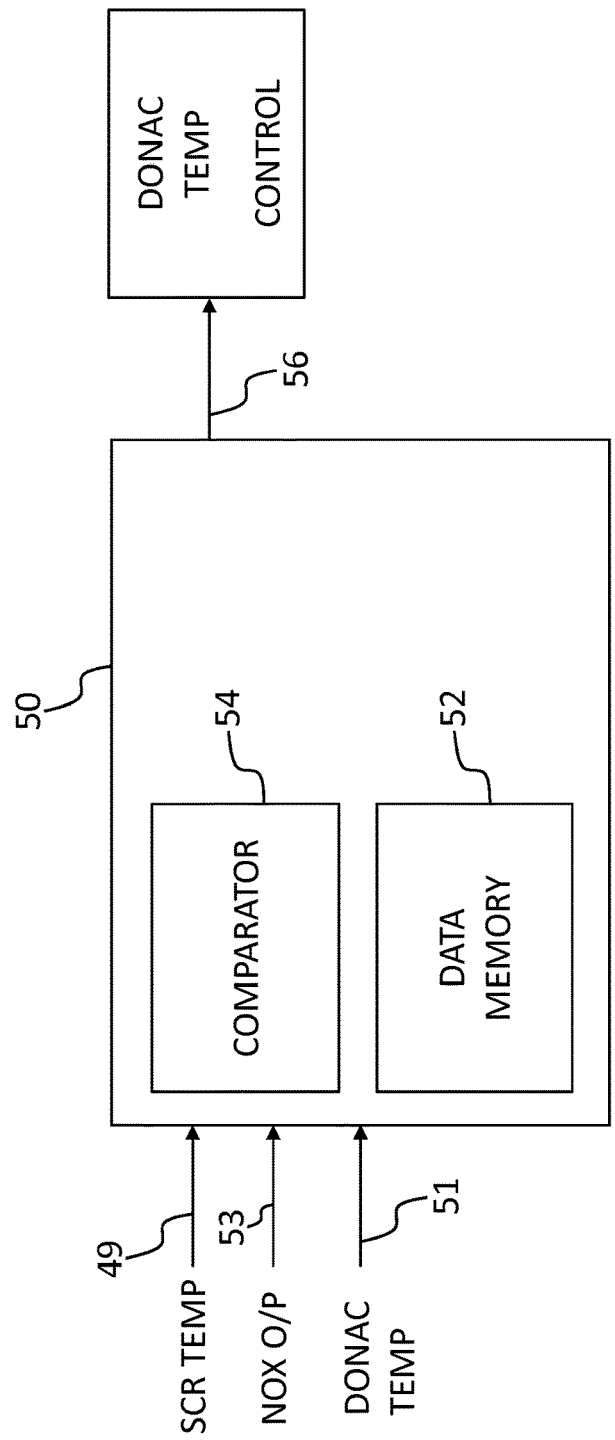
FIG. 4 is a schematic diagram of a control system for the exhaust system in FIG. 2.

Prior to installation in the vehicle, a set of calibration data is generated to model the NOx output from the SCR catalyst 48 (measured at the exhaust pipe outlet 34) as a function of SCR temperature and to map or model the NOx output from the DONAC 38 as a function of DONAC temperature. The calibration model is stored on a memory 52 of the exhaust control system 50 (as mentioned previously), typically in the form of a data map or look-up table or model, as shown in FIG. 4, for use real-time during engine operation. The calibrated data set stored on the memory 52 also includes data relating the NOx output from the SCR catalyst 48 to the SCR catalyst temperature. Once this data has been established it can be used during engine operation to ensure that, for any given temperature of the SCR catalyst 48, the DONAC 38 only releases NOx when the NOx conversion rate of the SCR catalyst is adequate to keep the NOx emission level at the exhaust outlet 34 within acceptable limits. The NOx flow may be measured directly with a sensor (not shown).

In use of the engine real-time, the temperature of the SCR catalyst 48 is monitored continuously by means of the temperature sensor at location 80 and a signal 49 representative of the temperature is input to the control system 50. The control system 50 also receives as an input a signal 51 derived from a temperature sensor located immediately downstream of the DONAC 38 at location 75. The temperature sensor at location 75 may be considered to be located 'mid-brick' where the DONAC 38 and the DPF 40 are located within a common unit.

In an alternative embodiment (not shown), instead of providing a temperature sensor for the DONAC 38, a model may be used to determine the temperature based on a temperature sensor mounted 'pre-turbine' of the engine turbo charger.

The NOx sensor, which measures the NOx level from the outlet portion 34 of the exhaust pipe 30, also outputs a signal 53 which is input to the control system 50. The control system 50 therefore receives a minimum of three inputs 49, 51, 53 (i) the temperature of the exhaust flow into the DONAC 38, (ii) the temperature of the SCR catalyst 48 and (iii) the NOx level output from the SCR catalyst 48.

The control system 50 further includes a comparator 54 which compares the SCR temperature with a model of SCR catalyst efficiency. If the temperature of the SCR catalyst is below a conversion threshold level, so that no effective NOx remediation takes place, and the temperature of the DONAC is relatively low, the NOx storage ability of the DONAC 38 is relatively high so that NOx is stored in the DONAC 38 rather than being released to flow to the SCR catalyst 48. This is beneficial because for periods of operation when the SCR catalyst 48 is ineffective, a relatively low proportion of NOx is released to the SCR catalyst.

By monitoring the temperature of the SCR catalyst 48, the temperature of the DONAC 38 can be maintained at a relatively high temperature when necessary to ensure that the high absorption ability prevents NOx emissions reaching the SCR catalyst 48 for periods of operation where it is ineffective at converting NOx. Taking the example data shown in FIG. 3, the conversion threshold level for the SCR catalyst 48 is about 210 degrees Centigrade, so that for catalyst temperatures below this the DONAC 38 retains a high NOx absorption function. In summary, therefore, based on the pre-calibrated data set stored in the memory 52, if the temperature of the SCR catalyst 48 is below the threshold level, the storage ability of the DONAC 38 is at a level that is sufficient to prevent too much NOx reaching the SCR catalyst 48.

As the temperature of the SCR catalyst 48 increases, a point is reached at which the comparator 54 determines that the SCR catalyst temperature is above the conversion threshold, so that it reaches a temperature at which it starts to become effective for NOx conversion. As the temperature of the exhaust flow through the DONAC 38 increases the ability of the DONAC 38 to store NOx naturally starts to reduce. However, rather than relying on the natural tendency of the DONAC 38 to reduce its NOx absorption, by monitoring the output of NOx from the outlet portion 34 of the exhaust pipe 30, the temperature of the DONAC 38 can be controlled so as to ensure that the release of NOx from the DONAC 38 is matched with the ability of the SCR catalyst 48 to convert NOx, hence keeping the NOx emissions level from the exhaust outlet 34 within acceptable limits. The exhaust control system therefore outputs a control signal 56 to control the temperature of the exhaust flow through the DONAC in response to the SCR catalyst temperature. Active management of the DONAC 38 in this way ensures an optimum NOx conversion rate at the SCR catalyst 48 by making use of the pre-calibrated model stored in the memory 52.

If the NOx emissions level from the exhaust outlet 34 starts to increase to too high a level, active control of the SCR temperature and urea dosing control on the SCR can be used to reduce the level.

The NOx measurements and temperature measurements are continued until the SCR catalyst 48 has reached a temperature at which the NOx emission level is satisfactory. Once a steady state condition has been reached, and NOx levels are satisfactory, measurements may be carried out intermittently for fault diagnostic purposes. For example, for a given temperature of the SCR catalyst 48, and a given temperature of the DONAC 38, the calibration data set can be used to determine whether the expected NOx level is detected at the exhaust outlet 34. If the expected NOx level at the exhaust outlet, for the temperature pairing, does not correspond to the measured NOx level, or does not correspond within an acceptable degree of error, this provides an indication that the DONAC storage ability is compromised or that the SCR functionality is not optimum. This may provide an indication that the DONAC 38 needs attention or needs replacing.

Figure 5:
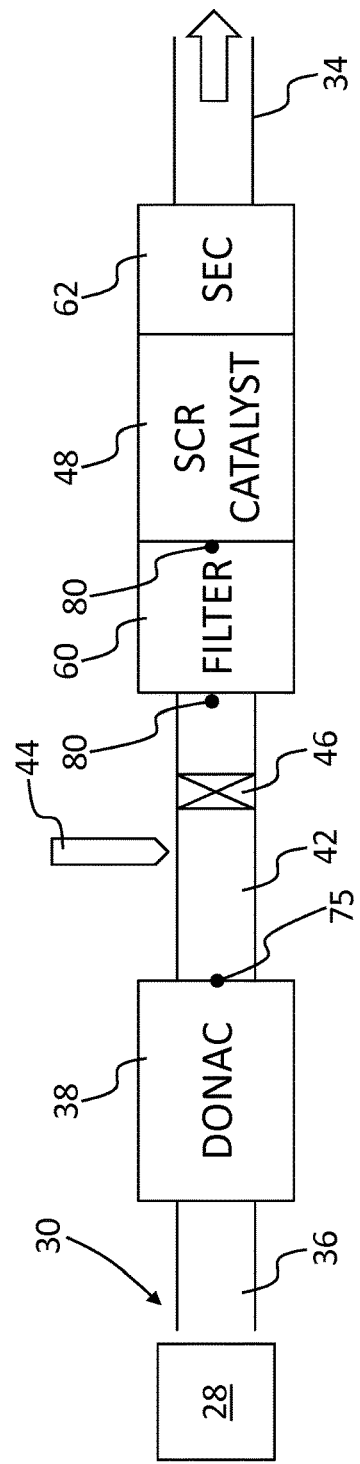
FIG. 5 is a schematic diagram of an exhaust system of an alternative exhaust system to that shown in FIG. 2.

Referring to FIG. 5, similar parts in an alternative embodiment of the invention are identified with the same reference numbers as in FIG. 2. In this embodiment, the components of the exhaust system are arranged in a different configuration so that the DPF 40 is removed, and instead a filter (such as a Selective Catalytic Reduction Filter (SCRF)) 60 may be arranged immediately upstream of the SCR catalyst 48. In addition, a secondary emissions catalyst (SEC) 62 may be arranged immediately downstream of the SCR catalyst 48 to remove secondary emissions (such as hydrocarbons) from the exhaust prior to it being expelled from the outlet 34. In this arrangement the filter 60, the SCR catalyst 48 and the SEC 62 may be arranged in a common housing unit located between the central and outlet portions 42, 34 of the exhaust pipe 30. During DPF regeneration, the SEC 62 will control CO and HC emissions derived from soot combustion. During non-regenerative conditions the SEC 62 will control ammonia slip.

Although not shown, the SEC 62 may also be implemented in the embodiment of FIG. 2.

The temperature of the SCR catalyst 48 may be determined by means of the temperature sensor mounted on the catalyst at location 80, as described previously, or in an alternative embodiment may be based on a software-implemented prediction of the temperature.

Similarly, the temperature of the DONAC 38 may be determined by means of the temperature sensor located at 75, or in an alternative embodiment the temperature may be determined by thermal modeling.

It will be appreciated by a person skilled in the art that the invention could be modified to take many alternative forms to that described herein, without departing from the scope of the appended claims.

There may be provided an exhaust system for an internal combustion engine for controlling the release of undesirable emissions from the engine, the exhaust system comprising:

an exhaust pipe for receiving an exhaust flow from the engine;

an SCR catalyst arranged in the exhaust flow;

means for determining the temperature of the SCR catalyst.

a NOx absorber located in the exhaust flow at a position upstream of the SCR catalyst for absorbing and releasing NOx contained in the exhaust flow.

Further aspects of the present invention are set out in the following numbered Clauses:

Clause 1. An exhaust system for an internal combustion engine for controlling the release of undesirable emissions from the engine, the exhaust system comprising an exhaust pipe for receiving an exhaust flow from the engine, an SCR catalyst arranged in the exhaust flow; a determination module configured to determine the temperature of the SCR catalyst, a NOx absorber located in the exhaust flow at a position upstream of the SCR catalyst for absorbing and releasing NOx contained in the exhaust flow, and a control system configured to control the NOx absorber so as to control the release of NOx to the SCR catalyst in dependence on the temperature of the SCR catalyst.

Clause 2. The exhaust system according to Clause 1, wherein the control system includes a comparator for comparing the temperature of the SCR catalyst with a threshold temperature below which the SCR catalyst is substantially ineffective at NOx conversion.

Clause 3. The exhaust system according to Clause 1, wherein the control system is configured to operate above the threshold temperature.

Clause 4. The exhaust system according to Clause 1, wherein the control system includes a first data memory for storing data relating the temperature of the SCR catalyst to the conversion of the SCR catalyst; and a second data memory for storing data relating the temperature of the NOx absorber to the release of NOx from the absorber.

Clause 5. The exhaust system according to Clause 4, wherein the first data memory is the same as the second data memory.

Clause 6. The exhaust system according to Clause 1, comprising an injector for injecting a selective catalytic reducing agent into the exhaust flow upstream of the SCR catalyst.

Clause 7. The exhaust system according to Clause 1, wherein the control system includes means for controlling the temperature of the NOx absorber so as to control the release of NOx to the SCR catalyst.

Clause 8. The exhaust system according to Clause 1, wherein the NOx absorber is a diesel oxidation and NOx absorber catalyst (DONAC).

Clause 9. The exhaust system according to Clause 1, further comprising a diesel particulate filter located in the exhaust pipe.

Clause 10. The exhaust system according to Clause 9, wherein the diesel particulate filter is arranged downstream of the NOx absorber.

Clause 11. The exhaust system according to Clause 10, wherein the diesel particulate filter and the NOx absorber are housed within a common housing.

Clause 12. The exhaust system according to Clause 1, comprising a secondary emissions catalyst located in the exhaust pipe downstream of the SCR catalyst for converting secondary emissions from the exhaust flow.

Clause 13. The exhaust system according to Clause 12, comprising a selective catalytic reduction filter located upstream of the SCR catalyst.

Clause 14. The exhaust system according to Clause 13, wherein the selective catalytic reduction filter and the SCR catalyst are housed in a common housing.

Clause 15. A method for controlling the release of undesirable emissions in an exhaust flow from an exhaust system of an internal combustion engine, the exhaust system having a SCR catalyst and a NOx absorber upstream of the SCR catalyst, the method comprising determining the temperature of the SCR catalyst; and controlling the NOx absorber in dependence on the temperature of the SCR catalyst so as to control the release of NOx from the NOx absorber to the SCR catalyst.

Clause 16. The method according to Clause 15, comprising comparing the temperature of the SCR catalyst with a threshold temperature at which the SCR catalyst becomes effective at remediating NOx in the exhaust flow; and controlling the NOx absorber in dependence on the result of the comparison.

Clause 17. The method according to Clause 15, wherein controlling the NOx absorber comprises controlling the temperature of the NOx absorber at a relatively high temperature if the temperature of the SCR catalyst is above the threshold temperature so as to increase the release of NOx from the absorber to the SCR catalyst.

Clause 18. A control system for controlling the release of undesirable emissions in an exhaust flow from an exhaust system of an internal combustion engine, the exhaust system having a SCR catalyst and a NOx absorber upstream of the SCR catalyst, the exhaust control system comprising a receiver configured to receive an input representative of the temperature of the SCR catalyst, a first data memory for storing data relating the temperature of the SCR catalyst to the conversion of the SCR catalyst, a further receiver configured to receive an input representative of the temperature of the NOx absorber, a second data memory for storing data relating the temperature of the NOx absorber to the release of NOx from the absorber, and output module configured to generate an output signal for controlling the NOx absorber in dependence on the temperature of the SCR catalyst so as to control the release of NOx from the absorber to the SCR catalyst.

Clause 19. The control system according to Clause 18, wherein the first data memory is the same as the second data memory.

Clause 20. A method for diagnosing a fault in the exhaust system according to Clause 1, comprising in addition to measuring the temperature of the SCR catalyst, measuring the temperature of the NOx absorber; determining, based on pre-determined calibration data, an expected NOx absorption level downstream of the SCR catalyst corresponding to the measured temperature of the NOx absorber and the measured temperature of the SCR catalyst; measuring the NOx level in the exhaust flow downstream of the SCR catalyst; comparing the measured NOx level with the expected NOx level and, in the event that the measured NOx level does not correspond to the expected NOx level, providing an indication that there is a fault within the exhaust system.

Clause 21. A vehicle comprising an exhaust system according to Clause 1.

Clause 22. A vehicle comprising an exhaust control system according to Clause 21.

The invention claimed is:

1. A method for diagnosing a fault in an exhaust system for an internal combustion engine for controlling the release of undesirable emissions from the engine, wherein the exhaust system comprises an exhaust pipe that receives an exhaust flow from the engine, an SCR catalyst arranged in the exhaust flow, a temperature sensor configured to determine a temperature of the SCR catalyst, a NOx absorber located in the exhaust flow at a position upstream of the SCR catalyst that absorbs and releases NOx contained in the exhaust flow and a control system that controls the NOx absorber so as to control the release of NOx to the SCR catalyst in dependence on the temperature of the SCR catalyst, the method comprising:

measuring a temperature of the NOx absorber;

determining, based on pre-determined calibration data, an expected NOx level downstream of the SCR catalyst corresponding to the measured temperature of the NOx absorber and the determined temperature of the SCR catalyst;

measuring an NOx level in the exhaust flow downstream of the SCR catalyst; and comparing the measured NOx level with the expected NOx level and, in the event that the measured NOx level does not correspond to the expected NOx level, providing an indication that there is a fault within the exhaust system.

2. The method as claimed in claim 1, wherein the control system comprises a comparator that compares the temperature of the SCR catalyst with a threshold temperature below which the SCR catalyst is insufficiently effective at NOx conversion.

3. The method as claimed in claim 2, wherein the control system is configured to operate above the threshold temperature.

4. The method as claimed in claim 1, wherein the control system comprises:

a first data memory that stores data relating the temperature of the SCR catalyst to a conversion of the SCR catalyst; and a second data memory that stores data relating a temperature of the NOx absorber to the release of NOx from the absorber.

5. The method as claimed in claim 4, wherein the first and second data memory are the same data memory.

6. The method as claimed in claim 1, further comprising an injector that injects a selective catalytic reducing agent into the exhaust flow upstream of the SCR catalyst.

7. The method as claimed in claim 1, wherein the control system comprises a temperature controller that controls the temperature of the NOx absorber so as to control the release of NOx to the SCR catalyst.

8. The method as claimed in claim 1, wherein the NOx absorber is a diesel oxidation and NOx absorber catalyst (DONAC).

9. The method as claimed in claim 1, further comprising a diesel particulate filter located in the exhaust pipe.

10. The method as claimed in claim 9, wherein the diesel particulate filter is arranged downstream of the NOx absorber, and wherein the diesel particulate filter and the NOx absorber are within a common housing.

11. The method as claimed in claim 1, comprising a secondary emissions catalyst located in the exhaust pipe downstream of the SCR catalyst for converting secondary emissions in the form of carbon monoxide, hydrocarbons, and ammonia slip from the exhaust flow.

12. The method as claimed in claim 11, comprising a selective catalytic reduction filter located upstream of the SCR catalyst, and wherein the selective catalytic reduction filter and the SCR catalyst are in a common housing.

* * * * *